United States Patent [19]

Hillyer et al.

[11] 3,955,113

[45] May 4, 1976

[54] BRUSH HOLDER WITH MEANS FOR LIMITING TRAVEL OF BRUSH SPRING

[75] Inventors: Michael John Hillyer, Mechanicsburg; Christian Raymond Carlson, Dillsburg, both of Pa.

[73] Assignee: General Signal Corporation, Rochester, N.Y.

[22] Filed: Nov. 27, 1974

[21] Appl. No.: 527,566

[52] U.S. Cl. .......... 310/245

[51] Int. Cl.² .......... H02K 13/00

[58] Field of Search .......... 310/239, 242, 245, 247, 310/248, 240, 246

[56] References Cited

UNITED STATES PATENTS

| | | | |
|---|---|---|---|
| 2,194,620 | 3/1940 | Sekyra | 310/247 |
| 2,474,601 | 6/1949 | Thomas | 310/247 |
| 2,536,827 | 1/1951 | Thomas | 310/247 |
| 2,748,302 | 5/1956 | Boeckel | 310/247 |
| 2,813,208 | 11/1957 | Ritter | 310/247 |
| 3,308,321 | 3/1967 | Provost | 310/239 |
| 3,376,444 | 4/1968 | Eaton | 310/247 |
| 3,523,288 | 8/1970 | Thompson | 310/245 |
| 3,534,206 | 10/1970 | Carey | 310/247 |
| 3,710,160 | 1/1973 | Voglesonger | 310/247 |
| 3,735,172 | 5/1973 | Battaglia | 310/239 |

*Primary Examiner*—R. Skudy
*Attorney, Agent, or Firm*—Milton E. Kleinman; George W. Killian

[57] ABSTRACT

The invention comprises a motor brush holder assembly including a brush holder member and a brush member which is free for reciprocal longitudinal motion in said brush holder. The assembly includes captured brush spring means for urging longitudinal motion of the brush in one direction. The configuration of the holder is such as to confine the brush spring within the holder. The brush spring confining means may include a planar member between the spring and the brush. The cross section of the interior of the holder may exceed that of the brush; or a portion of either the planar member, or of the brush spring, may project through a slot of the brush holder which does not extend the full length of the holder. By this means there is an assurance that the brush spring cannot project beyond the front of the brush holder and make contact with the commutator.

7 Claims, 11 Drawing Figures

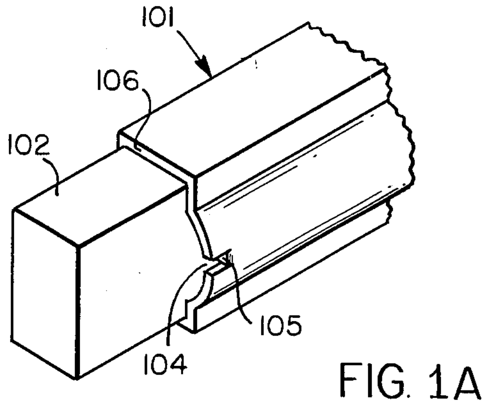
FIG. 1A
FIG. 1B
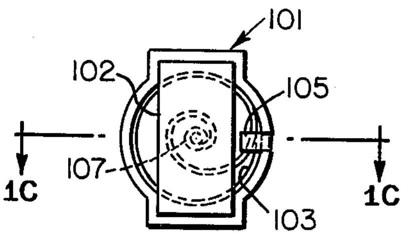
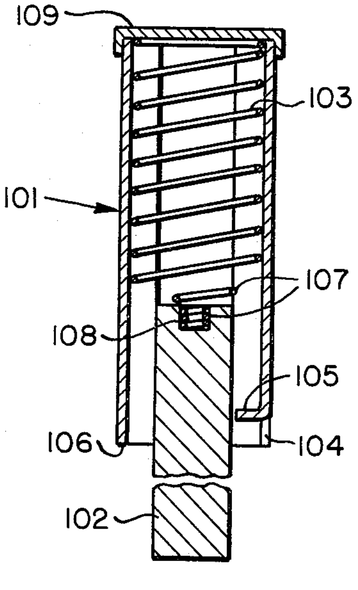
FIG. 1C

BRUSH HOLDER WITH MEANS FOR LIMITING TRAVEL OF BRUSH SPRING

BACKGROUND OF THE INVENTION

1. Field of the Invention

The present invention pertains to a brush holder assembly as used in small electric motors or generators. The assembly includes a brush holder, a brush, and a brush spring for urging the brush in a direction to expel it from an open end of the brush holder. When the assembly is complete, the brush spring will hold the brush against the commutator.

2. Description of the Prior Art

Many types of brush holder assemblies have been devised for a variety of specific applications. Some designs are directed principally to economy while others are directed to ease of assembly. Other design features include: maintenance of proper contact pressures between brush and commutator; means for indicating that a brush should be replaced; improvement of the electrical conduction from the brush to another point; and other design criteria.

It is generally desirable to provide a means to prevent the total wearing away of the brush and particularly to prevent the brush spring, which urges the brush towards the commutator, from ever coming in contact with the commutator. In the past, it has been customary to satisfy this design criteria by the use of a pigtail type connection between the brush and some reference point. That is, a pigtail of flexible stranded wire is securely coupled to the interior end of the brush and the other end of the pigtail is secured to the interior of the brush holder with such a length between the two ends of the pigtail that the forward motion of the brush is limited and so that, therefore, neither the brush spring nor the pigtail may ever come in contact with the motor commutator.

SUMMARY OF THE INVENTION

The invention is specifically directed to a brush holder assembly such as is used in small electric motors and which is designed for cooperating with a rotating commutator. The structure is specifically designed to eliminate the possibility of the brush spring, which urges the brush towards the commutator, from ever coming in contact with the commutator. The spring is retained within the brush holder by providing means, associated with the brush holder, for limiting the maximum forward excursion of the spring. The motion limiting means may comprise a bent over tab of the brush holder so that the forward coils of the brush spring will be engaged by the tab and limit the continued forward motion of the brush spring. With this construction, the brush holder must have a section which is larger than the cross section of the brush so that the travel limiting means will not interfere with the reciprocal motion of the brush. In some configurations, the brush may include a special shape or keyway type slot to permit its longitudinal reciprocal motion past the travel limiting means.

In another structure, the brush holder may include a slot through which a member extends and which resides between the spring and the brush. Or alternatively, one or more loops of the spring may include an ear which projects through the slot in the brush holder.

If desired, means may be provided for securing a portion of the spring to one end of the brush.

It is a principal object of this invention to provide a new and improved brush and brush holder assembly.

It is a more specific object of the invention to provide a brush holder assembly which will prevent the brush spring, which urges the brush towards the commutator, from coming in contact with the commutator when the brush is worn.

It is a more specific object of the invention to confine the brush spring within the brush holder.

It is another object of the invention to provide a travel limiting means, associated with the brush holder, for limiting the forward excursion of the brush spring.

It is another object of the invention to provide a brush spring which is configured in such a manner as to prevent it from extending beyond the end of the brush holder.

It is another object of the invention to provide a member which will limit the forward travel of the brush spring without in any way limiting the longitudinal reciprocal motion of the brush.

It is another object of the invention to provide a brush holder which will support a brush for longitudinal reciprocal motion and accommodate a brush spring which is larger, in at at least one direction, than the brush.

BRIEF DESCRIPTION OF THE DRAWING

FIG. 1A is a partial perspective view of one form of the combined brush and brush holder of the invention;

FIG. 1B is a front view of the structure of FIG. 1A;

FIG. 1C is a section view taken on line 1C—1C of FIG. 1B;

DESCRIPTION OF THE PREFERRED EMBODIMENT

The brush holder of the present invention may have a wide variety of forms and may be adapted to accommodate a wide variety of brushes. For the present discussion, it will be assumed, for the most part, that brushes are essentially rectangular in cross section. However, it should be understood that the invention may be adapted for use with brushes which are round, square, hexagonal or other cross sectional shapes as well as rectangular.

Small motors and/or generators usually include a rotating section usually designated either a rotor or armature and it is necessary to conduct current to or from windings formed on the armature. Typically, the current is conducted to or from the rotating element to a stationary terminal by means of a commutator on the armature and a stationary brush. The use of brushes for conducting current to and from a rotating armature carrying a commutator are old and well established and are known to those familiar with the use of motors and generators. Typically, the brushes are made of a carbon composition which has been found to be suitable for conducting current. The particular size and cross section of a brush depends upon a wide variety of factors including, but not limited to, the diameter of the commutator, the spacing between segments of the commutator, the maximum amount of current that must be conducted, the desired life of the system, and possibly the temperature, humidity, and atmosphere in which the system may be used. These factors are not considerations in the present invention and will be ignored herein inasmuch as the invention disclosed herein is generally suitable for any carbon brush and commutator combination.

Figure 6:
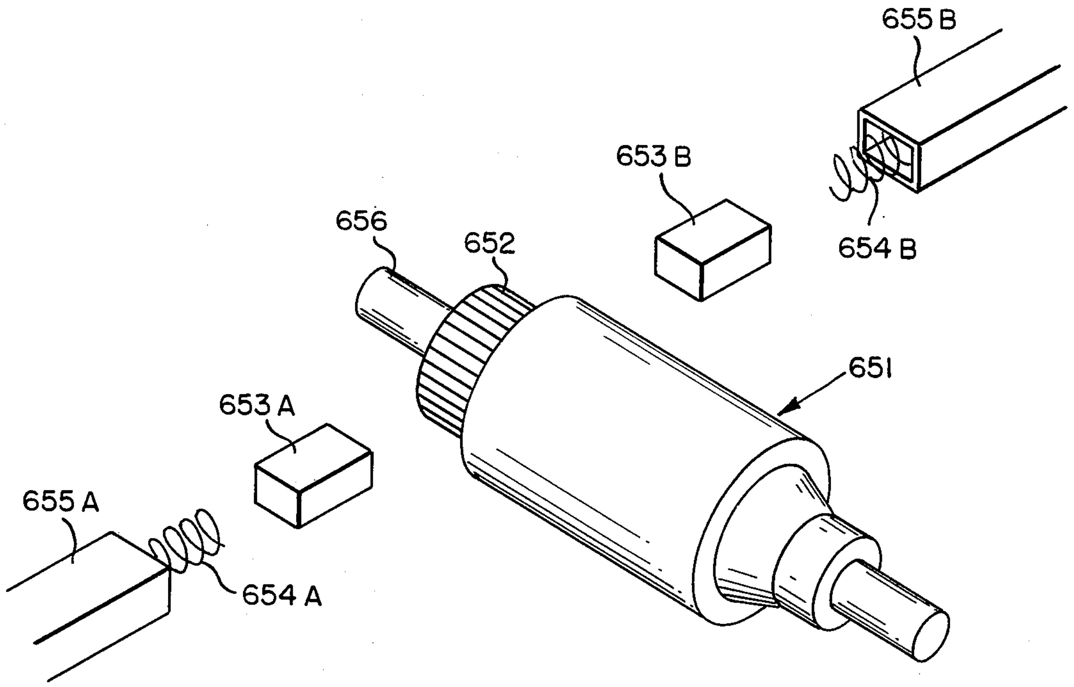
FIG. 6 is a partial perspective and exploded view illustrating the cooperation between a brush and its associated rotating armature.

FIG. 6 shows a rotor 651 which is supported in a motor housing (not shown) and which includes a commutator 652. Shown in exploded view is a pair of carbon brushes 653A and 653B, brush springs 654A and 654B, and brush housings 655A and 655B. It should be understood that the rotor 651 is designed for rotational movement with its shaft 656 and that the brushes 653A and 653B which are shown in the exploded view are in contact with the commutator 652 and are maintained in a stationary position because they are captured within the brush housing 655A and 655B, respectively, which in turn are mounted on the motor housing (not shown). The brush springs 654A and 654B serve to urge their respective brushes 653A and 653B into contact with the commutator 652. Suitable electrical connections (not shown) conduct electricity to and from the brushes 653A and 653B. It should be understood that the brushes and brush housings, to be described with relation to the remaining figures, are situated for association with a rotor in essentially the manner illustrated in FIG. 6.

More specific consideration will now be given to the various forms of the invention as shown in the remaining figures. For convenience in understanding the invention and the equivalence of parts in the various figures, each element will be given a three digit identification number wherein the first digit indicates the figure in which the element is shown and the remaining two digits more specifically identify the particular element. Elements in the various figures which are equivalent one to the other will be given identification numbers such that the last two digits coincide.

Considering now more specifically FIG. 1A, 1B and 1C, there will be seen one form of the invention wherein FIG. 1A comprises a partial perspective view, FIG. 1B comprises a front view and FIG. 1C comprises a section view.

The brush holder 101 is arranged to hold a rectangular brush 102 and to accommodate a brush spring 103 which is round and which has a diameter which is greater than the width of the brush 102. The brush holder 101 will be seen to have a cross section which comprises the outer perimeter of a superimposed rectangle and circle. That is, the brush holder 101 is designed to accommodate the brush 102 and support it for reciprocal longitudinal motion and at the same time to provide a housing for the brush spring 103 within the brush holder 101. The brush holder 101 includes a slot 104 and a tab 105 which is bent inward. As may be best seen in FIGS. 1B and 1C the length of the tab 105 is such that it will not contact the brush 102 and interefere with its reciprocal longitudinal motion. However, the tab 105 can engage a loop of the spring 103 and prevent the spring 103 from expanding and moving towards the front 106 of the brush holder 101. Or more specifically, only a limited portion of the spring 103 may advance to a position forward of the tab 105. The spring 103 may comprise a plurality of turns having a diameter which will nearly fill the circular portion of the brush holder 101. In addition, the brush spring 103 may include a few turns of a reduced and which may project forward of the tab 105. The reduced diameter turns 107 of the spring 103 may be designed to engage with a hole 108 of the brush 102 and thereby provide an improved electrical contact between the brush 102 and the brush spring 103 and also to retain these elements as a sub-assembly.

The assembly of the brush holder 101, the brush 102 and the spring 103 may be retained by a brush holder cap 109 that closes the rear end of the brush holder 101.

The assembly shown in FIGS. 1A, 1B and 1C may be used with the rotor 651 of FIG. 6. The brush 102 would correspond with the brush 653A of FIG. 6, the spring 103 would correspond with the spring 654A of FIG. 6 and the brush holder 101 would correspond with the brush holder 655A of FIG. 6.

In a new motor the brush 102 would have a substantial length and the spring 103 would be compressed within the brush holder 101 when the assembly is complete and the brush 102 is contacting the commutator 652. As the motor is used, the brush 102 will wear away and the brush spring 103 will urge the brush 102 towards the commutator 652 and thereby maintain electrical contact. After considerable wear, and corresponding reduction in the length of the brush 102, one of the turns of the brush spring 103 will come in contact with the tab 105 and thereby prevent further motion of the brush 102 towards the commutator 652. If the tab 105 was not provided, the brush 102 could continue to wear until eventually one of the forward turns of the brush spring 103, such as turn 107, could come in direct contact with the commutator 652 and cause mechanical damage and/or the possibility of electrical shock.

A slot 104 and tab 105 are shown on one side of the brush holder 101. If desired, a similar slot and tab could be provided on the other side of the brush holder 101. Also, as will be discussed in connection with other figures, the spring 103 need not have the reduced diameter turns 107 if the features obtained thereby are not required.

Figure 2A:
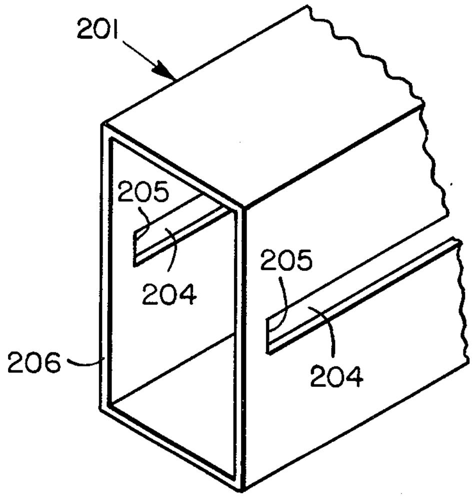
FIG. 2A is a partial perspective view of another form of brush holder.
Figure 2B:
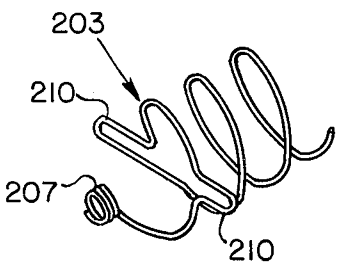
FIG. 2B illustrates a brush spring for use in the brush holder of FIG. 2A.

Considering now more specifically FIGS. 2A and 2B, there will be seen an alternate form of the invention. In FIG. 2A there is illustrated a brush holder 201 which is made to accommodate a brush (not shown). The brush holder 201 includes a slot 204 on each of two opposite sides. The slots 204 do not extend all the way to the front 206 of the brush holder 201.

FIG. 2B illustrates the brush spring 203 which may be used together with the brush holder 201. The brush spring 203 may include reduced diameter turns 207 if these are desired for coupling the spring 203 to a brush 202 (not shown). The diameter of the turns of the brush spring 203 are such that they will fit inside the brush housing 201 and be nearly tangent to the interior walls of the brush holder 201. A forward turn of the spring 203 will be seen to include ears 210 which are proportioned to project through slots 204. Accordingly, the ears 210 will prevent the associated turn of the brush spring 203 from advancing forward within the brush holder 201 beyond the forward limit 205 of the slot 204. Accordingly, the ears 210 cooperate with the forward limit 205 of the slot 204 to function in substantially the same manner as the tab 105 to limit the forward motion of the spring 203.

The rear end of the brush holder 201 would be closed by some suitable means. If conditions made it desirable or expedient, it would be possible to use a single ear 210 and a single slot 204. Or alternatively, slots 204 could be used on additional surfaces of the brush holder 201 and additional ears 210 could be provided if desired.

The structure shown in FIGS. 2A and 2B, when combined with a brush and assembled together with a commutator 652, will provide the same protective and safeguard features as discussed in connection with FIGS. 1A, 1B and 1C.

Figure 3A:
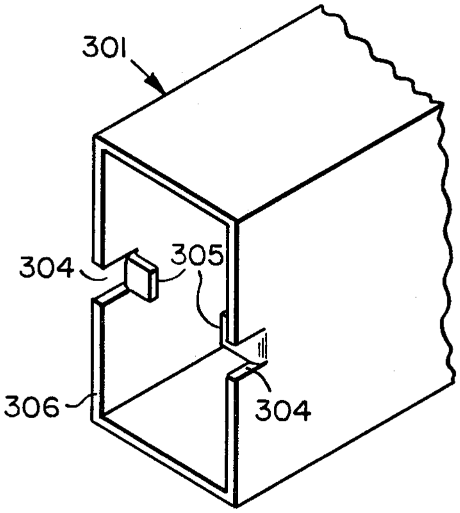
FIG. 3A is a partial perspective view of an alternate form of the brush holder.
Figure 3B:
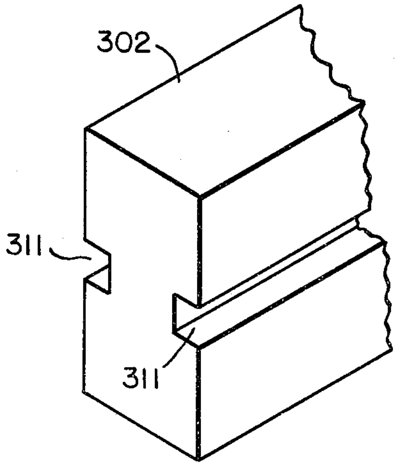
FIG. 3B comprises a perspective view of a brush which may be used with the brush holder of FIG. 3A.

Considering now more specifically FIGS. 3A and 3B, there is shown an alternate structure which may be used when circumstances warrant. FIG. 3A illustrates a brush holder 301 which is made to accommodate a brush 302. The brush holder has a slot 204 and tabs 205 which will inhibit the forward motion of a contained brush spring (not shown). The brush holder 301 may have either a square or rectangular cross section for accommodating a brush 302 for reciprocal longitudinal motion. As shown in FIG. 3B, the brush 302 which is retained by the brush holder 301 must include longitudinal slots 311 which will permit the longitudinal reciprocal motion of the brush 302 past the tabs 305. Normally, the longitudinal slots 311 will extend the entire length of the brush 302. However, it would be possible to terminate the slots 311 short to the rear end of the brush 302 so that the brush cannot extend beyond the tabs 205. However, even if the slots 311 do extend the entire length of the brush 302 the tabs 205 will serve to capture the brush spring (not shown) and prevent it from extending beyond the front 306 of the brush holder 301 to provide the same advantages and features as set forth with respect to the other figures.

Figure 4:
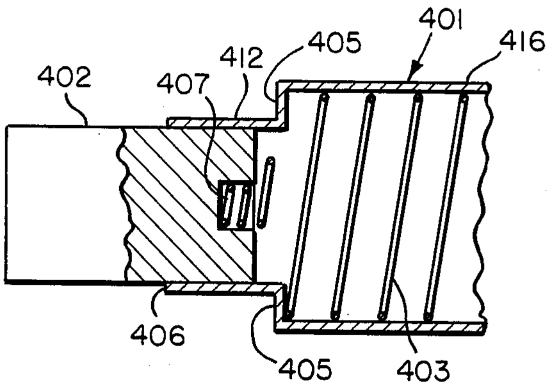
FIG. 4 is a cross section view of an alternate form of the invention showing the brush spring secured to the brush.

FIG. 4 illustrates another alternate form of the invention and includes a brush holder 401 which may be seen to include a forward portion 412 of reduced cross section which is proportioned to support a brush 402 for longitudinal reciprocal motion. The rear portion 416 of the brush holder 401 includes an enlarged compartment which houses the brush spring 403 which serves the usual function of urging the brush 402 toward the commutator 652. Because the brush spring 403 is larger than the forward portion 412 of the brush holder 401 the brush spring 403 cannot advance sufficiently far forward towards the front 406 of the brush holder 401 to contact the commutator 652.

The spring 403 may include reduced diameter turns 407 for coupling together the spring 403 and the brush 402. The portion 405 which joins the forward portion 412 of the brush holder 401 with the rear portion 416 serves as a tab for limiting the forward motion of the brush spring 403.

Figure 5A:
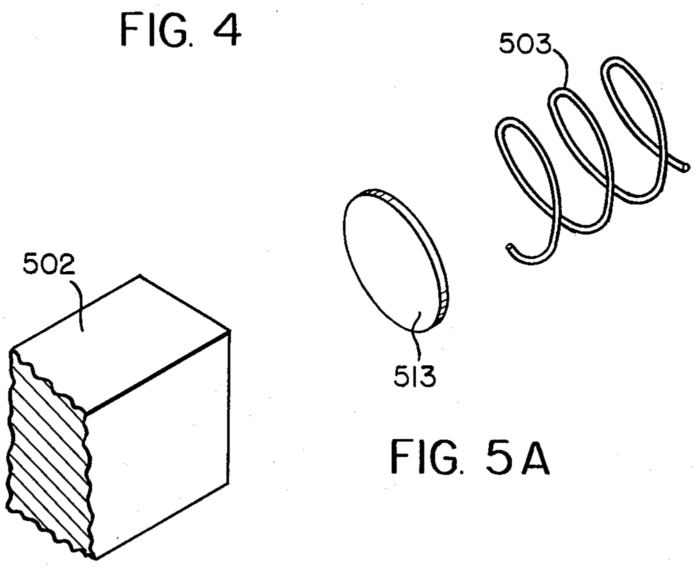
FIG. 5A is a partial perspective view illustrating a planar element which may be disposed between the brush spring and the brush.

For a variety of design considerations, it may be considered undesirable to use a tab, such as 105 shown in FIG. 1A, for limiting the forward motion of the spring. One reason would be because, in theory at least, the spring 103 might be caused to rotate about its axis and slowly work its way forward of the tab 105 by, in effect, screwing the spring 103 past the tab 105. In order to absolutely prevent this possibility, a planar element such as the disc 513 as shown in FIG. 5 may be placed between the brush 502 and the brush spring 503. If the components of FIG. 5A are considered as assembled into, for example, the brush holder 101, it will be seen that under no conditions could the vibration and rotation of the spring 503 cause it to advance forward of the tab 105 as the element 513 will be stopped by the tab 105. The element 513 could assume any suitable cross section to accommodate the associated brush holder, such as brush holders 101 or 201.

When a disc or planar element 513 is not used and the structure according to FIGS. 1A, 1B and 1C is used, it will be seen that it is possible to affect an assembly from the forward end of the brush holder 101 by screwing the brush spring 103 into its place. Or alternatively, the spring could be inserted from the forward end prior to the forming of the tabs 105. In a similar manner, when the planar element 513 is used, assembly can also be made from the front if the tabs 105 are formed subsequent to the insertion of the brush spring 103 and the planar member 513.

Figure 5B:
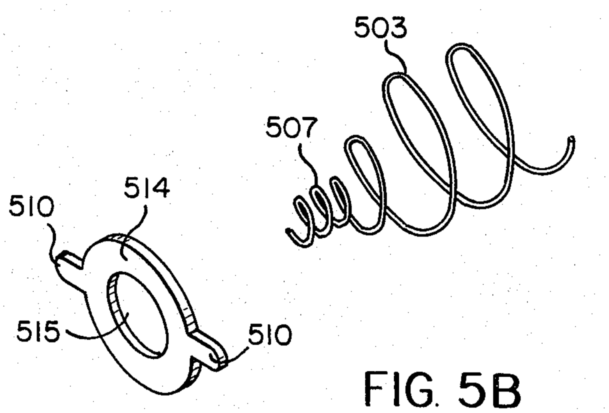
FIG. 5B illustrates an alternate form of planar element which may be used between the brush spring and the brush together with the brush housing of FIG. 2A.

FIG. 5B illustrates an alternate form 514 of the planar member 513. The planar member 514 may be provided with ears 510 so that this member may be used with the brush holder 201 of FIG. 2A. In addition, the planar member 514 illustrates the use of a hole 515 so that a spring 503 having reduced diameter turns 507 may project through the hole 515 of the planar member 514 so that the brush 502 may be coupled to the reduced diameter turns 507 in the manner more fully described in connection with FIG. 1C.

While there has been shown and described what is considered at present to be the preferred embodiment of the invention, modification thereto will readily occur to those skilled in the related arts. For example, various modifications may be used to accommodate brushes having a different cross section and/or to facilitate assembly and mounting. It is believed that no further analysis or description is required and that the foregoing so fully reveals the gist of the present invention, that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope if the invention.

What is claimed is:

1. A commutator brush assembly comprising in combination;

a a brush;

b a brush holder having a first section for retaining and confining said brush for reciprocal longitudinal motion with respect to said brush holder;

c spring means captured within a second section of said brush holder and co-acting with one end of said brush for urging the other end of said brush to project from said brush holder when said brush is assembled in said first section of said brush holder; and d retaining means comprising a bent tab section of said brush holder for limiting the maximum extension of said spring means.

2. An improved brush holder assembly for use with an electric motor or generator and comprising in combination:

a a longitudinal brush holder member open at one end and having closure means at the other end;

b a brush member disposed within said brush holder and guided for longitudinal reciprocal motion with respect to said brush holder and extending through said one open end;

c spring means disposed within said brush holder between said other end thereof and the brush member for urging said brush member towards said open end; and wherein d said brush holder includes limiting means comprising a bent over tab portion of said brush holder for restricting the longitudinal excursion of said spring means towards said open end without restricting the longitudinal excursion of said brush member.

3. The combination as set forth in claim 2, wherein a cross section of said brush holder taken normal to the longitudinal axis thereof would constitute the outer perimeter of a rectangle superimposed on a circle and wherein the diameter of the circle has a magnitude between that of the two legs of the rectangle and wherein said tab portion is bent inward from the circle portion of said cross section.

4. The combination as set forth in claim 3 and wherein said tab portion does not infringe on the boundaries of said rectangle.

5. The combination as set forth in claim 2 and wherein said brush member has a longitudinal slot situated to permit longitudinal motion of said brush means past said tab portion and wherein said spring means is a coil spring having a diameter which prevents its longitudinal motion towards said one end past said tab.

6. An improved brush holder assembly for use with an electric motor or generator and comprising in combination:

a a longitudinal brush holder member open at one end and having closure means at the other end;

b a brush member disposed within said brush holder and guided for longitudinal reciprocal motion with respect to said brush holder and extending through said one open end;

c spring means disposed within said brush holder between said other end thereof and the brush member for urging said brush member towards said open end;

d said brush holder member having a wall with a longitudinal slot extending from said other end towards, but not to, said one end; and wherein e said spring means has an ear formed thereon and extending through said slot for cooperating with said slot to restrict the longitudinal excursion of said spring means towards said open end without restricting the longitudinal excursion of said brush member.

7. A commutator brush assembly comprising in combination:

a a brush;

b a brush holder having a first section for retaining and confining said brush for reciprocal longitudinal motion with respect to said brush holder;

c spring means captured within a second section of said brush holder and co-acting with one end of said brush for urging the other end of said brush to project from said brush holder when said brush is assembled in said first section of said brush holder; and d retaining means including:

1. a wall of said brush holder having a longitudinal slot; and
2. an ear formed on said spring means for cooperating with said slot to limit the maximum extension of said spring means.

* * * * *